(12) United States Patent
Chesneau

(10) Patent No.: US 11,742,755 B2
(45) Date of Patent: Aug. 29, 2023

(54) VOLTAGE CONVERTER AND METHOD

(71) Applicant: STMicroelectronics (Grenoble 2) SAS, Grenoble (FR)

(72) Inventor: David Chesneau, Grenoble (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 21 days.

(21) Appl. No.: 17/388,591

(22) Filed: Jul. 29, 2021

(65) Prior Publication Data

US 2022/0038005 A1     Feb. 3, 2022

(30) Foreign Application Priority Data

Jul. 30, 2020 (FR) ...................................... 2008099

(51) Int. Cl.
    *H02M 3/158*     (2006.01)
(52) U.S. Cl.
    CPC .................................. *H02M 3/158* (2013.01)
(58) Field of Classification Search
    CPC .... H02M 3/158; H02M 3/156; H02M 3/1588; H02M 1/08
    See application file for complete search history.

(56) References Cited

U.S. PATENT DOCUMENTS

| | | | |
|---|---|---|---|
| 5,652,772 A | 7/1997 | Isaksson et al. | |
| 5,732,113 A | 3/1998 | Schmidl et al. | |
| 5,987,063 A | 11/1999 | Rinne | |
| 6,295,217 B1 | 9/2001 | Yang et al. | |
| 6,295,326 B1 | 9/2001 | Tonissen et al. | |
| 6,320,915 B1 | 11/2001 | Stott et al. | |
| 6,359,938 B1 | 3/2002 | Keevill et al. | |
| 6,363,128 B1 | 3/2002 | Isaksson et al. | |
| 6,658,063 B1 | 12/2003 | Mizoguchi et al. | |
| 6,731,594 B1 | 5/2004 | Bohnke | |
| 7,039,000 B2 | 5/2006 | You et al. | |
| 7,586,294 B2 | 9/2009 | Endo | |
| 7,863,875 B1 | 1/2011 | Guo et al. | |

(Continued)

FOREIGN PATENT DOCUMENTS

| EP | 2819288 A1 | 12/2014 |
|---|---|---|
| EP | 3468022 A1 | 4/2019 |
| KR | 20100102824 A | 9/2010 |

OTHER PUBLICATIONS

U.S. Appl. No. 17/078,284, filed Oct. 23, 2020.
U.S. Appl. No. 17/388,553, filed Jul. 29, 2021.

*Primary Examiner* — Adolf D Berhane
*Assistant Examiner* — Afework S Demisse
(74) *Attorney, Agent, or Firm* — Slater Matsil, LLP

(57) ABSTRACT

An embodiment voltage converter includes a first transistor and a second transistor coupled in series, and a first circuit configured to control the first and second transistors. The control terminal of the second transistor is coupled to a first output of the first circuit by a second circuit configured to delay the control signals supplied at the first output by a first duration. The control terminal of the first transistor is coupled to a second output of the first circuit by a circuit configured to delay the control signals supplied at the second output, for a second period of each operating cycle, by a duration equal to twice the first duration and, during a second period of each operating cycle, by a duration equal to the first duration.

22 Claims, 4 Drawing Sheets

(56) References Cited

U.S. PATENT DOCUMENTS

| | | |
|---|---|---|
| 7,872,456 B2 | 1/2011 | Li et al. |
| 8,199,537 B2 | 6/2012 | Yan et al. |
| 9,077,242 B2 | 7/2015 | Causse et al. |
| 9,112,425 B2 | 8/2015 | Prescott et al. |
| 9,325,233 B2 | 4/2016 | Bennett et al. |
| 9,467,051 B2 | 10/2016 | Stoichita et al. |
| 9,577,527 B2 | 2/2017 | Trichy et al. |
| 9,621,036 B2 | 4/2017 | Wibben |
| 9,722,490 B2 | 8/2017 | Archibald |
| 9,991,798 B2 | 6/2018 | Lu |
| 10,944,324 B2 | 3/2021 | Chesneau |
| 2002/0057082 A1 | 5/2002 | Hwang |
| 2002/0159533 A1 | 10/2002 | Crawford |
| 2002/0181509 A1 | 12/2002 | Mody et al. |
| 2003/0123582 A1 | 7/2003 | Kim et al. |
| 2004/0001563 A1 | 1/2004 | Scarpa |
| 2004/0005018 A1 | 1/2004 | Zhu et al. |
| 2004/0190438 A1* | 9/2004 | Maltsev ............ H04L 27/2675 370/206 |
| 2005/0018458 A1 | 1/2005 | Shimada et al. |
| 2006/0001410 A1 | 1/2006 | Ishikawa et al. |
| 2006/0113980 A1* | 6/2006 | Yoshida ............ H02M 3/1588 323/282 |
| 2006/0192536 A1 | 8/2006 | Chen et al. |
| 2007/0024261 A1 | 2/2007 | Wong et al. |
| 2007/0057658 A1 | 3/2007 | Hasegawa et al. |
| 2007/0069703 A1 | 3/2007 | Kokubun et al. |
| 2007/0090819 A1 | 4/2007 | Hasegawa |
| 2008/0298106 A1 | 12/2008 | Tateishi |
| 2008/0315851 A1 | 12/2008 | Akiyama et al. |
| 2009/0079405 A1 | 3/2009 | Brokaw et al. |
| 2009/0160412 A1 | 6/2009 | Latham et al. |
| 2010/0033153 A1 | 2/2010 | Xing et al. |
| 2010/0072964 A1 | 3/2010 | Qiu et al. |
| 2010/0320991 A1 | 12/2010 | Yoshino |
| 2010/0327836 A1 | 12/2010 | Li et al. |
| 2011/0031948 A1 | 2/2011 | Chien et al. |
| 2011/0316495 A1 | 12/2011 | De Nie |
| 2012/0038331 A1 | 2/2012 | Wu et al. |
| 2012/0049826 A1 | 3/2012 | Hsu et al. |
| 2012/0161738 A1* | 6/2012 | Nakashima ........... H02M 3/158 323/284 |
| 2013/0106385 A1 | 5/2013 | Smith, Jr. et al. |
| 2013/0207563 A1 | 8/2013 | Hamamoto et al. |
| 2014/0191744 A1 | 7/2014 | Choi et al. |
| 2015/0077080 A1* | 3/2015 | Chen .................... H02M 3/156 323/282 |
| 2016/0233768 A1 | 8/2016 | de Cremoux et al. |
| 2016/0306371 A1 | 10/2016 | Svorc et al. |
| 2018/0062513 A1 | 3/2018 | Arbetter |
| 2019/0267897 A1 | 8/2019 | Hsieh |
| 2020/0136508 A1 | 4/2020 | Bandyopadhyay et al. |
| 2021/0126535 A1 | 4/2021 | Esch et al. |
| 2021/0184580 A1 | 6/2021 | Chesneau |
| 2022/0345040 A1 | 10/2022 | Couleur et al. |

* cited by examiner

VOLTAGE CONVERTER AND METHOD

CROSS-REFERENCE TO RELATED APPLICATIONS

This application claims the benefit of French Application No. 2008099, filed on Jul. 30, 2020, which application is hereby incorporated herein by reference.

TECHNICAL FIELD

The present disclosure generally concerns electronic circuits. It more particularly concerns DC/DC voltage converters, of switched-mode power supply type, which convert a DC power supply voltage into a DC output voltage, for example buck-type DC/DC voltage converters where the DC output voltage has a lower value than the DC power supply voltage.

BACKGROUND

In a switched-mode power converter, a direct current (DC) voltage for powering the converter is chopped by the switching of switches to implement phases of power storage in an inductive element and phases of discharge, towards a load connected to the converter output, of the power stored in the inductive element.

In a pulse frequency modulation (PFM)-type switched-mode converter, each operating cycle of the converter comprises a phase of power storage in the inductive element, followed by a phase of power delivery to the load connected to the converter. During the power storage phase, the current flowing through the inductive element increases. During the power delivery phase, the current flowing through the inductive element decreases. For each operating cycle, it is desirable for the current flowing through the inductive element to be null at the beginning of the power storage phase and at the end of the power delivery phase.

Known switched-mode converters, particularly of PFM type, have various disadvantages.

SUMMARY

There is a need to overcome all or part of the disadvantages of known switched-mode converters, particularly of PFM type.

An embodiment overcomes all or part of the disadvantages of known switched-mode converters, particularly of PFM type.

An embodiment voltage converter comprises a first transistor connected between a first node of the converter and a second node configured to receive a power supply potential; a second transistor connected between the first node and a third node configured to receive a reference potential; and a first circuit configured to control the first and second transistors; the control terminal of the second transistor being coupled to a first output of the first circuit by a second circuit configured to delay the control signals supplied at the first output by a first duration; the control terminal of the first transistor being coupled to a second output of the first circuit by a third circuit configured to delay the control signals supplied at the second output, during a first period of each operating cycle, by a duration substantially equal to twice the first duration and, during a second period of each operating cycle, by a duration substantially equal to the first duration.

An embodiment method of operation of a voltage converter comprises a first transistor connected between a first node of the converter and a second node configured to receive a power supply potential; a second transistor connected between the first node and a third node configured to receive a reference potential; and a first circuit configured to control the first and second transistors, the method comprising, during each operating cycle: a first period during which the control signal of the second transistor is delayed, by a second circuit, by a first duration and the control signal of the first transistor is delayed by a duration substantially equal to twice the first duration, by a third circuit; and a second period during which the control signal of the second transistor is delayed, by the second circuit, by the first duration and the control signal of the first transistor is delayed by a duration substantially equal to the first duration, by the third circuit.

According to an embodiment, the first duration is a propagation time of a comparator.

According to an embodiment, the converter comprises a comparator configured to compare a set point voltage with a first voltage, the first voltage being equal, during the first period, to a first increasing ramp and during the second period to a second decreasing ramp.

According to an embodiment, the converter comprises a first multiplexer having an output coupled to an input of the comparator and having a first input coupled to a first ramp generator and a second input coupled to a second ramp generator.

According to an embodiment, each operating cycle comprises only one first ramp and only one second ramp.

According to an embodiment, the first ramp increases from a value smaller than the set point voltage and the second ramp decreases from a value greater than the set point voltage.

According to an embodiment, the first duration is substantially equal to the propagation time of the comparator.

According to an embodiment, the converter comprises an inductance connected between the first node and an output node of the converter.

According to an embodiment, the value of the current in the inductance at the beginning and at the end of a cycle is substantially equal to 0.

According to an embodiment, the third circuit comprises a second multiplexer comprising an output coupled to the control terminal of the first transistor and receiving, on a first input, the control signal of the first transistor delayed by twice the first duration and, on a second input, the control signal of the first transistor delayed by once the first duration.

According to an embodiment, the first and second multiplexers receive a same multiplexer control signal, the multiplexer control signal being capable of taking: a first value corresponding, for the first multiplexer, to the outputting of the first ramp and, for the second multiplexer, to the outputting of the signal delayed by twice the first duration; and a second value corresponding, for the first multiplexer, to the outputting of the second ramp and, for the second multiplexer, to the outputting of the signal delayed by once the first duration.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the usual applications where a DC/DC converter may be provided have not been detailed, the described embodiment being compatible with such usual applications.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the following description, when reference is made to the voltage of a node, it is considered that it is, unless otherwise indicated, the voltage between the node and a reference potential, typically the ground. Further, when reference is made to the potential of a node, it is considered that this potential is, unless otherwise indicated, referenced to the reference potential. The voltage and the potential of a given node will further be designated with a same reference.

Figure 1:
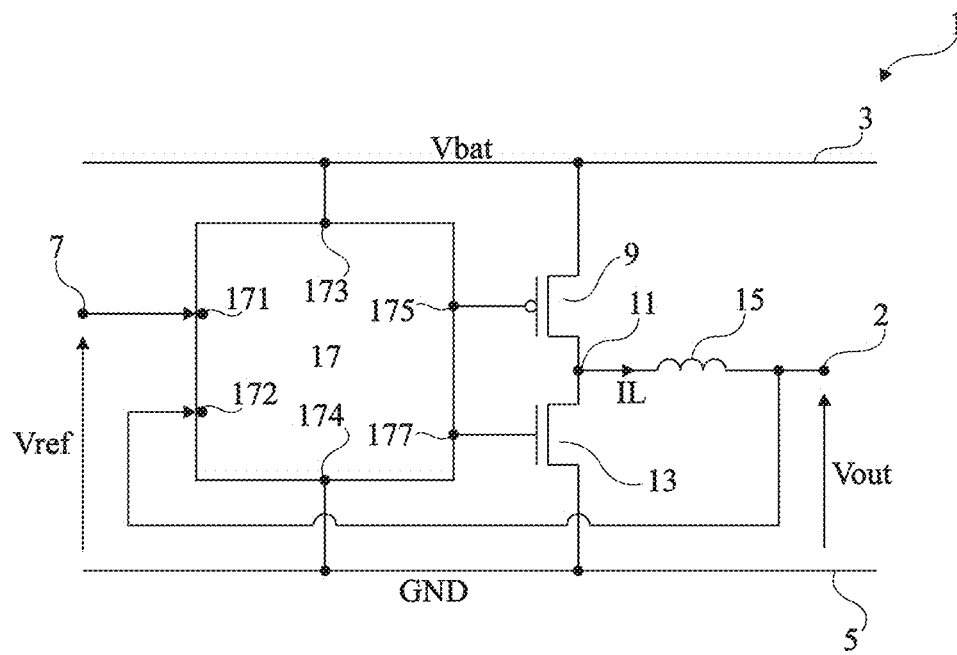
FIG. 1 schematically shows an embodiment of a DC/DC voltage converter.

FIG. 1 schematically shows an example of a voltage converter 1 of the type to which the described embodiments apply. In this example, converter 1 is a DC/DC converter, which converts a DC power supply voltage into a DC output voltage.

Converter 1 is configured to deliver a DC output potential Vout referenced to a reference potential, typically ground GND. The converter comprises an output node 2, on which potential Vout is available.

Converter 1 is powered with a DC power supply potential Vbat, referenced to reference potential GND, typically the ground. Converter 1 is then connected between a first conductive rail or node 3 set to potential Vbat and a second conductive rail or node 5 set to reference potential GND.

Converter 1 is configured to deliver potential Vout at a value equal to a set point value. For this purpose, converter 1 receives, on an input node 7, a DC potential set point Vref referenced to potential GND, having a value representative of the set point value of potential Vout, preferably equal to the set point value of potential Vout.

In this example, potentials Vout, Vbat, and Vref are positive.

In this example, converter 1 is of buck type, that is, the set point value of potential Vout is smaller than the value of potential Vbat. In other words, the value of potential Vout is smaller than that of potential Vbat.

Converter 1 comprises a first MOS ("metal oxide semiconductor") transistor 9, preferably a PMOS transistor (P-channel MOS transistor). As a variant, transistor 9 may also be an NMOS transistor associated with a "bootstrap" system. MOS transistor 9 is connected between rail 3 and an internal node 11. In other words, a first conduction terminal of transistor 9, for example, its source, is connected to rail 3, a second conduction terminal of transistor 9, for example its drain, being connected to node 11.

Converter 1 further comprises a second MOS transistor 13, preferably an NMOS transistor (N-channel MOS transistor). Transistor 13 is connected between node 11 and rail 5. In other words, a first conduction terminal of transistor 13, for example, its source, is connected to rail 5, a second conduction terminal of transistor 13, for example, its drain, being connected to node 11.

Thus, transistors 9 and 13 are series-connected between rails 3 and 5 and are connected to each other at the level of inner node 11.

Converter 1 comprises an inductive element or inductance 15. Inductance 15 is connected between node 11 and node 2.

Converter 1 comprises a control circuit 17. Circuit 17 is configured to implement or control the operating cycles of converter 1, to regulate potential Vout so that its value is equal to set point value Vref.

For this purpose, circuit 17 comprises:
a terminal 171 coupled, preferably connected, to node 7;
a terminal 172 coupled, preferably connected, to node 2;
a terminal 173 coupled, preferably connected, to rail 3;
a terminal 174 coupled, preferably connected, to rail 5;
a terminal 175 coupled, preferably connected, to a control terminal, or gate, of transistor 9; and
a terminal 177 coupled, preferably connected, to a control terminal, or gate, of transistor 13.

Converter 1 comprises an output capacitor (not shown) connected between node 2 and rail 5. As an example, this capacitance is in the order of from 2.2 µF to 20 µF, or even more. Such an output capacitor plays the role of a filter. In other words, the converter output capacitor enables to smooth the current present on node 2 and to store power supplied to node 2 by the converter.

Although this is not shown herein, in operation, a load is connected between node 2 and rail 5 to be powered with potential Vout. The load for example comprises an input capacitor between node 2 and rail 5.

In this example, converter 1 is configured to operate in pulse frequency modulation (discontinuous conduction mode). Circuit 17 is then configured to start an operating cycle of converter 1 when the value of potential Vout is smaller than set point value Vref and the two transistors 9 and 13 are in the off state. More particularly, at the beginning of each operating cycle, circuit 17 is configured to control the setting to the on state of transistor 9, transistor 13 being left in the off state. Power is then stored in inductance 15, during a first time period TPon, for example constant for each operating cycle when transistor 9 is maintained in the on state by circuit 17, a current IL then flowing through inductance 15. At the end of time period TPon, circuit 17 is configured to control the setting to the off state of transistor 9 and the setting to the on state of transistor 13. Power is then delivered back by inductance 15 to the load connected at the converter output, for a second time period TNon, for example constant for each operating cycle when transistor 13 is maintained in the on state by circuit 17, the current IL in the inductance decreasing. At the end of time period TNon, circuit 17 is configured to control the setting to the off state of transistor 13.

Time period TNon is determined so that the time when circuit 17 controls the setting to the off state of transistor 13 corresponds to the time when the current IL flowing through inductance 15 becomes null. However, in practice, as will be described in further detail in the rest of the disclosure, this is not always true, which raises an issue.

Figure 2:
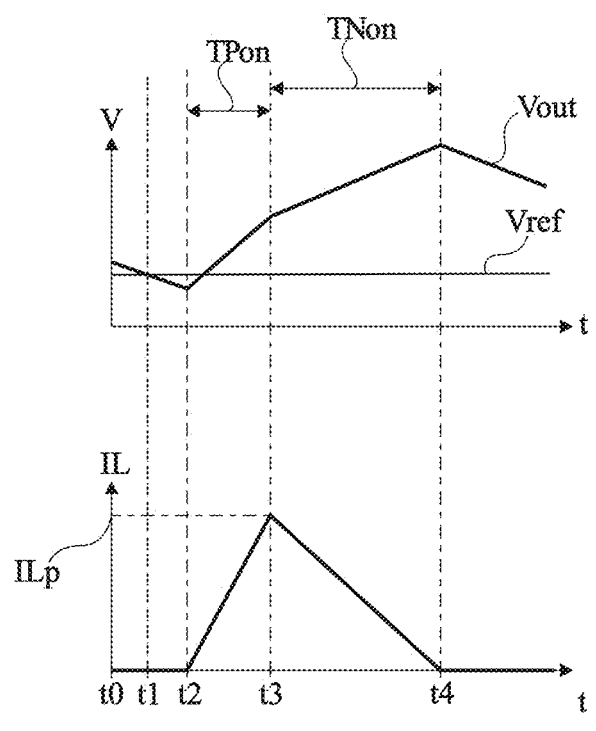
FIG. 2 shows timing diagrams illustrating an example of operation of the converter of FIG. 1.

FIG. 2 shows timing diagrams illustrating an example of desired operation of the converter 1 of FIG. 1.

The timing diagram at the top of FIG. 2 illustrates the variation over time t of potential Vout, in volts V, the timing diagram at the bottom of FIG. 2 illustrating the corresponding variation, over time t, of the current IL flowing through inductance 15.

At a time t0, transistors 9 and 13 are in the off state, current IL is null, and the value of potential Vout is greater than its set point value, in the present example the value of potential Vref.

Between time t0 and a subsequent time t2, potential Vout decreases, for example due to the fact that the load connected to converter 1 consumes current and discharges the output capacitor.

At a time t1 between times t0 and t2, potential Vout becomes smaller than its set point value Vref. This is detected by the circuit 17 of converter 1, which then controls the setting to the on state of transistor 9. Transistor 9 turns on at time t2.

Thus, from time t2, inductance 15 has a terminal connected to node 2 and a terminal coupled to rail 3, via transistor 9. The current IL flowing through inductance 15 increases.

As a result, from time t2, current IL is delivered to node 2, and the capacitor (not shown in FIG. 1) between node 2 and rail 5 charges. Potential Vout increases and becomes greater again than its set point value Vref.

At a next time t3, equal to t2+TPon, circuit 17 controls the setting to the on state of transistor 13 and the setting to the off state of transistor 9. At time t3, the current in the inductance has a maximum value ILp.

Thus, from time t3, inductance 15 has a terminal connected to node 2 and a terminal coupled to rail 5, via transistor 13. The current IL flowing through inductance 15 decreases.

Although current IL decreases from time t3, as long as it is not null, the capacitor between node 2 and rail 5 keeps on charging and potential Vout keeps on increasing if the current drawn by the load is smaller than the current IL supplied to node 2.

At a next time t4, equal to t3+TNon, circuit 17 controls the setting to the off state of transistor 13. It is here considered that converter 1 operates as it should, and current IL is then null at time t4. However, in practice, this is not always true.

From time t4, current IL is null and potential Vout decreases, similarly to what would happen at time t0.

Although this is not shown herein, when the value of potential Vout falls back below its set point value Vref at a time subsequent to time t4, circuit 17 implements a new operating cycle such as described in relation with the successive times t2, t3, and t4.

Figure 3:
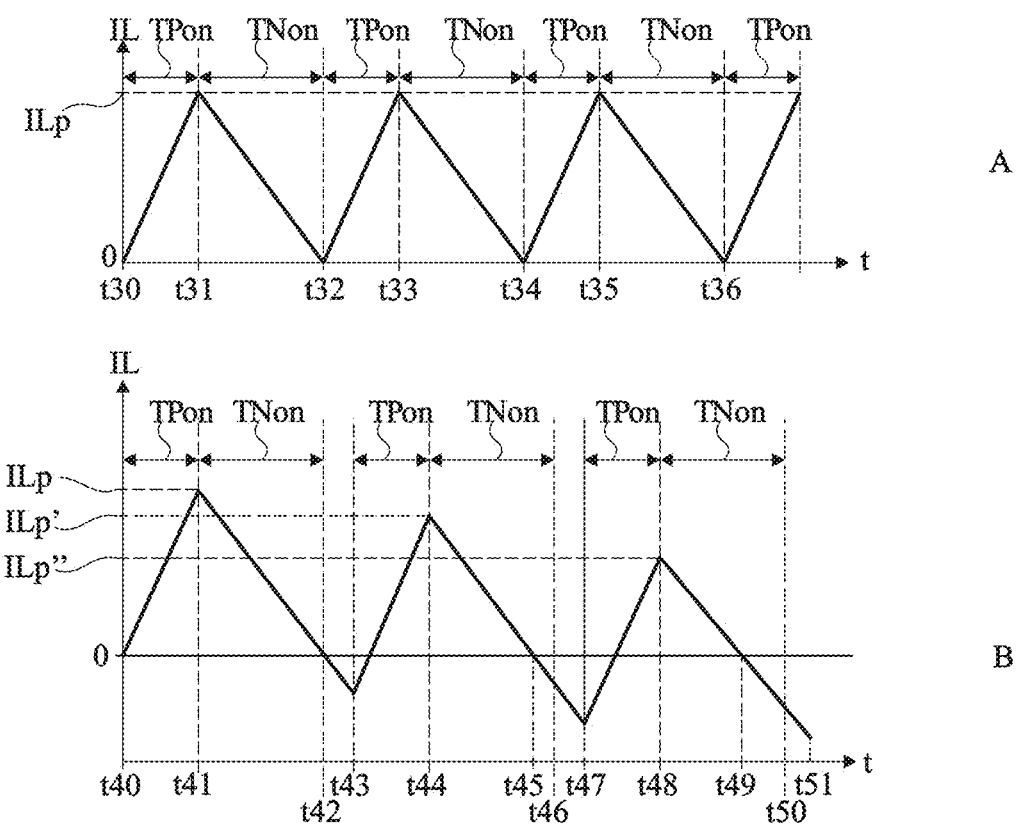
FIG. 3 shows other timing diagrams illustrating the desired or theoretical operation and the real or practical operation of the converter of FIG. 1.

FIG. 3 shows other timing diagrams illustrating the operation of the converter 1 of FIG. 1. More particularly, a timing diagram A (at the top of FIG. 3) shows an ideal or theoretical example of the variation of current IL and a timing diagram B (at the bottom of FIG. 3) shows an example of the real variation of current IL. The two timing diagrams A and B illustrate an example of operation where, for a plurality of successive operating cycles, voltage Vout is smaller than voltage Vref at the end of each operating cycle of converter 1.

At a time t30, although this is not illustrated in FIG. 3, voltage Vout is smaller than voltage Vref. An operating cycle starts with the switching to the on state of transistor 9. As a result, current IL increases until a next time t31 equal to t30+TPon.

At time t31, current IL reaches its maximum value ILp. Further, transistor 9 and 13 are respectively switched to the off state and to the on state. As a result, the current decreases until a next time t32 equal to t31+TNon.

In this example of ideal operation, transistor 13 is switched to the off state at time t32, and current IL becomes null at time t32.

At a time t32, voltage Vout being smaller than voltage Vref, transistor 9 is switched to the on state, which marks the beginning of a new operating cycle. Current IL then increases until a next time t33 equal to t32+TPon.

At time t33, current IL reaches value ILp. Further, transistor 9 and 13 are respectively switched to the off state and to the on state. As a result, the current decreases until a next time t34 equal to t33+TNon.

In this example of ideal operation, transistor 13 is switched to the off state at time t34, and current IL becomes null at time t34.

At a time t34, voltage Vout being smaller to voltage Vref, transistor 13 is switched to the on state, which marks the beginning of a new operating cycle. Current IL increases until a next time t35 equal to t34+TPon.

At time t35, current IL reaches value ILp. Further, transistor 9 and 13 are respectively switched to the off state and to the on state. As a result, the current decreases until a next time t36 equal to t35+TNon.

In this example of ideal operation, transistor 13 is switched to the off state at time t36 and current IL becomes null at time t36.

At time t36, voltage Vout being smaller than voltage Vref, a new operating cycle starts.

In the example of theoretical operation illustrated by timing diagram A, at the end of each operating cycle, the switching of transistor 13 to the off state occurs at the time when current IL becomes null. Thus, when an operating cycle is immediately followed by a new operating cycle, in this new operating cycle, current IL increases from a null value.

Timing diagram B illustrates a corresponding example of real operation of converter 1. In this example of real operation, the practically case where transistor 13 is not immediately switched to the off state at the end of the time period TNon which has elapsed from its last switching to the on state is considered.

At a time t40, voltage Vout being smaller than voltage Vref, an operating cycle starts with the switching to the on state of transistor 9. As a result, current IL increases until a next time t41 equal to t40+TPon.

At time t41, current IL reaches its maximum value ILp. Further, transistor 9 and 13 are respectively switched to the off state and to the on state. As a result, the current decreases until a next time t42 equal to t41+TNon. The current becomes null at time t42. However, the switching of transistor 13 to the off state is only effective at a time t43 subsequent to time t42. Thus, between times t42 and t43, current IL is negative and decreases. In other words, the current flows through inductance 15 from node 11 to node 2 before time t42, becomes null at time t42, and flows through inductance 15, from node 2 to node 11 after time t42.

At a time t43, voltage Vout being smaller than voltage Vref, transistor 9 is switched to the on state at time t43, which marks the beginning of a new operating cycle. Current IL then increases until a next time t44 equal to t43+TPon.

At time t44, current IL reaches a value ILp', smaller than maximum value ILp due to the fact that time period TPon is constant at each cycle. Further, transistor 9 and 13 are respectively switched to the off state and to the on state. As a result, current IL decreases until a next time t46 equal to t44+TNon, current IL becoming null at a time t45 between times t44 and t46. Further, the switching of transistor 13 to the off state is only effective at a time t47 subsequent to time t46. Thus, between times t45 and t47, current IL is negative and decreases to a value lower (or higher in absolute value) than that reached at time t43.

At time t47, voltage Vout being smaller than voltage Vref, transistor 9 is switched to the on state at time t47, which marks the beginning of a new operating cycle. Current IL then increases until a next time t48 equal to t47+TPon.

At time t48, current IL reaches a value ILp", smaller than value ILp'. Further, transistor 9 and 13 are respectively switched to the off state and to the on state. As a result, current IL decreases until a next time t50 equal to t48+TNon, current IL becoming null at a time t49 between times t48 and t50. Further, the switching of transistor 13 to the off state is only effective at a time t51 subsequent to time t50. Thus, between times t49 and t51, current IL is negative and decreases to a value lower (or higher in absolute value) than that reached at time t47.

Due to the fact that at each operating cycle illustrated by timing diagram B, the maximum value reached by current IL (times t41, t44, and t48) is lower and lower, converter 1 does not supply enough power to node 2 to regulate voltage Vout on its value Vref, voltage Vout being for example lower and lower, which raises an issue. Further, at each operating cycle illustrated by timing diagram B, the negative value reached by current IL (times t43, t47, and t51) is lower and lower (or higher and higher in absolute value), whereby converter 1 samples more and more power from node 2, which is not desirable. Indeed, the value of the current supplied to the load, and in particular the value of the current peak, decreases from one cycle to the other, which has a negative impact on the load power supply. Further, although, theoretically, the maximum value of current IL might infinitely decrease, in practice, transistor 13 may in certain cases be destroyed or damaged before this by negative values of the current IL that transistor 13 is not capable of conducting between its conduction terminals.

A practical example of operation where the switching to the off state of transistor 13 occurs after the time when current IL becomes null has been described in relation with the timing diagram B of FIG. 3.

In another practical example of operation, not illustrated, at each operating cycle of a plurality of successive cycles implemented immediately one after the others, transistor 13 is switched to the off state while current IL is not null and is still positive. In this case, at each of the operating cycles, current IL increases from a higher and higher value, whereby current IL reaches a higher and higher maximum value, and the operating cycle ends with a higher and higher positive non-zero value of current IL. This operation is less disturbing than that described in relation with timing diagram B since, after a plurality of operating cycles, voltage Vout will have recovered its set point value Vref. Thus, the next operating cycle will not be immediately implemented, which will leave time for current IL to become null.

Both cases, that is, the case described in relation with the timing diagram B of FIG. 3 and the other practical case described hereinabove, are generally at least partly caused by operating times of components, for example response or propagation times of comparators.

Figure 4:
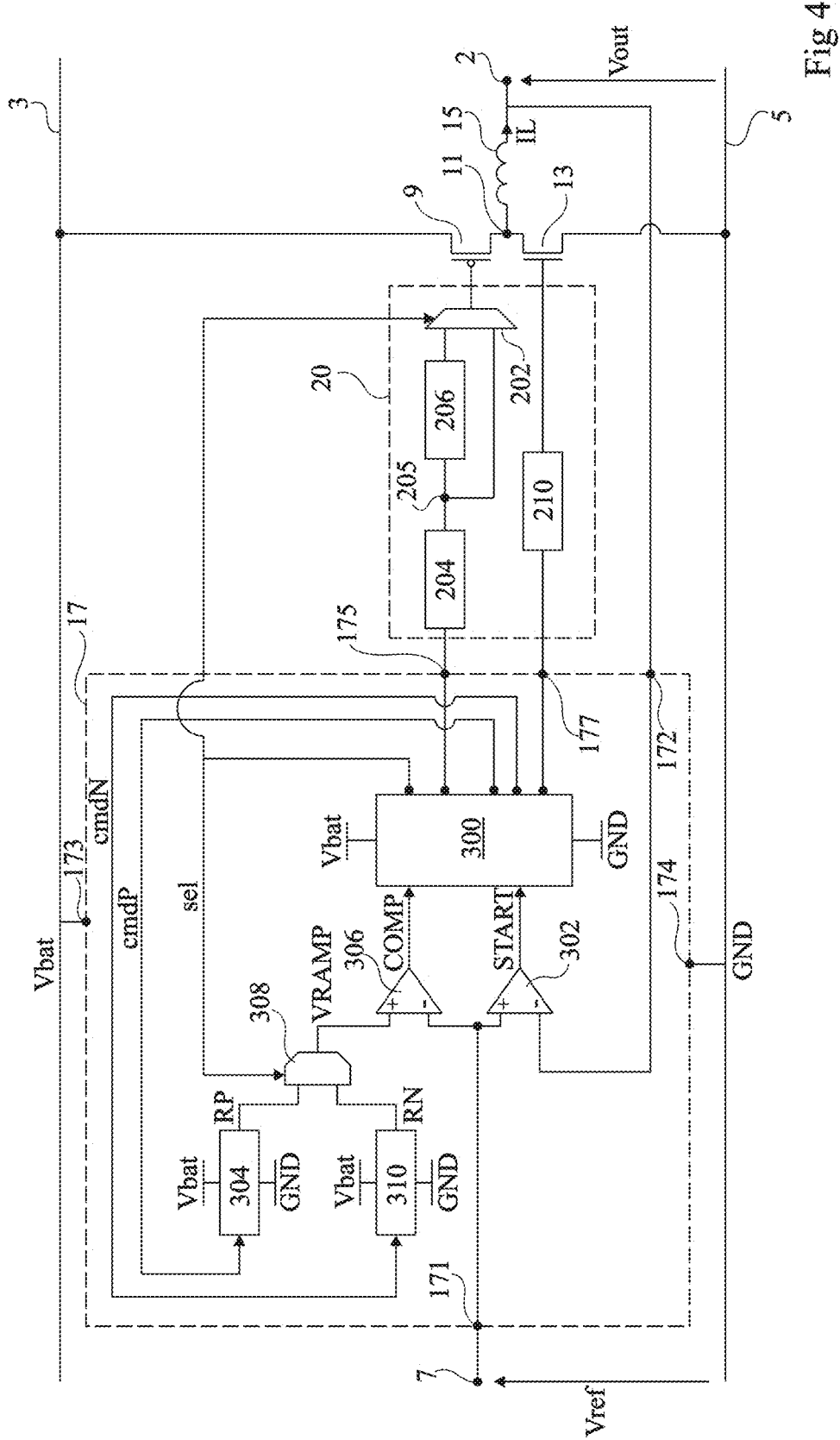
FIG. 4 shows an embodiment of a DC/DC voltage converter.

FIG. 4 shows an embodiment of a DC/DC voltage converter. The converter of FIG. 4 comprises the elements described in relation with FIG. 1, circuit 17 being more detailed.

Circuit 17 comprises a circuit 300, for example, a state machine. State machine 300 is configured to supply the control signals of transistors 9 and 13 to respective terminals 175 and 177 to implement the operation described in relation with FIG. 5 described hereinafter. To determine the control signals of transistors 9 and 13, state machine 300 receives a plurality of signals. Circuit 300 is powered with potential Vbat and is connected between rails 3 and 5, which connections are not detailed in FIG. 4 to avoid overloading the drawing.

Circuit 17 comprises a comparator 302 configured to deliver, on its output, a signal START representative of the comparison of the value of potential Vout with its set point value. The output of comparator 302 is coupled, for example, connected to circuit 300. Signal START is in a first state, for example, a high state, when the value of potential Vout is smaller than its set point value and in a second state, for example, a low state, when the value of potential Vout is greater than its set point value. Comparator 302 comprises a first input, for example, inverting (−), configured to receive a potential having a value representative of the value of potential Vout and a second input, for example, non-inverting (+) configured to receive a potential having a value representative of the set point value of potential Vout.

In this example where the value of potential Vref is equal to the set point value of potential Vout, comparator 302 is configured to compare potential Vref with potential Vout, the first input of comparator 302 being connected to node 2 and the second input of comparator 302 being connected to terminal 171 of circuit 17.

In this embodiment, time period TPon is determined by comparing a potential ramp RP with potential Vref or with potential Vout, where the latter can be considered as substantially equal to potential Vref. Thus, circuit 17 comprises a ramp generator 304 configured to deliver potential ramp RP and a comparator 306 configured to compare ramp RP with potential Vref or Vout, in the present example with potential Vref. Potential RP is referenced to reference potential GND.

Generator 304 is powered with potential Vbat and is connected between rails 3 and 5, which connections are not shown in FIG. 4 to avoid overloading the drawing.

Generator 304 is controlled by circuit 300, via a signal cmdP. More particularly, when signal START is in its first state, circuit 300 controls the setting to the on state of transistor 9 and, at the same time, the starting, or beginning, of a potential ramp RP via signal cmdP. As an example, signal cmdP is determined from the control signal supplied by circuit 300 to transistor 9, or even is identical to the control signal supplied by circuit 300 to transistor 9.

Each potential ramp RP is for example a ramp increasing from reference potential GND.

Ramp RP is transmitted to a first input, for example, non-inverting (+), of comparator 306, the second input, for example, inverting (−), of comparator 306 receiving potential Vref, and the output of comparator 306 delivering a signal COMP to circuit 300.

In FIG. 4, potential ramp RP is transmitted to comparator 306 via a selection circuit 308, or multiplexer, comprising two inputs, one output, and one control terminal. The control terminal of circuit 308 receives from circuit 300 a signal sel. According to the state of signal sel, circuit 308 transmits on its output the signal present on one or the other of its inputs. An output signal VRAMP of circuit 308 thus follows the variations of the signal present on one or the other of the inputs.

More particularly, at the time when circuit 300 orders the setting of transistor 9 to the on state and the beginning of a potential ramp RP, circuit 300 places signal sel in a first state such that comparator 306 receives potential ramp RP.

Thus, as long as signal sel is maintained in its first state, signal COMP is in a first state, for example, the low state, as long as potential RP is smaller than potential Vref, and switches to a second state, for example, the high state, as soon as potential RP becomes greater than potential Vref.

The switching of signal COMP from its first state to its second state marks the end of time period TPon. Circuit 300 then controls transistor 9 to the off state and transistor 13 to the on state. Preferably, circuit 300 simultaneously controls the end of potential ramp RP, via signal cmdP.

Time period TNon is determined by comparing a potential ramp RN with potential Vref or with potential Vout, and more particularly in the present example with potential Vref. Thus, circuit 17 comprises a ramp generator 310 configured to deliver potential ramp RN.

Generator 310 is powered with potential Vbat and is connected between rails 3 and 5, which connections are not shown in FIG. 4 to avoid overloading the drawing. Generator 310 is controlled by circuit 300, via a signal cmdN.

More particularly, at the end of time period TPon, when circuit 300 controls transistor 9 to the off state and transistor 13 to the on state, circuit 300 also causes the starting of a potential ramp RN via signal cmdN. As an example, signal cmdN is determined from the control signal delivered by circuit 300 to transistor 13, or even is identical to the control signal delivered by circuit 300 to transistor 13.

Each potential ramp RN is for example a ramp decreasing from power supply potential Vbat. Ramps RN and RP have slopes of opposite signs. Thus, one, here slope RP, is increasing and the other, here slope RN, is decreasing.

The comparison of ramp RN with potential Vref is for example implemented by comparator 306. Ramp RN is then transmitted to the second input of circuit 308. Further, circuit 300 is configured to switch signal sel to its second state, at the same time as it causes the setting to the off state of transistor 9 and the setting to the on state of transistor 13, so that ramp RN is transmitted to comparator 306.

Thus, in cases where each ramp RN is decreasing from potential Vbat, as long as signal sel is maintained in its second state, signal COMP is in its second state, for example, the high state, as long as potential RN is greater than potential Vref, and switches to its first state, for example, the low state, as long as potential RN becomes smaller than potential Vref.

The switching of signal COMP from its second state to its first state marks the end of time period TNon. Circuit 300 then controls the setting to the off state of transistor 13. Preferably, circuit 300 simultaneously controls the end of potential ramp RN, via signal cmdN.

In an alternative embodiment, not shown, the comparison of potential ramp RP with potential Vref is implemented by comparator 306, and the comparison of potential ramp RN with potential Vref is implemented by means of an additional comparator provided in circuit 17. The additional comparator then receives on a first input, for example, non-inverting (+), potential ramp RN, and on a second input, for example, inverting (−), potential Vref, the output of the additional comparator delivering, to circuit 300, a signal representative of the comparison of potential ramp RN with potential Vref. In this variation, circuit 308 is omitted and circuit 300 does not generate signal sel. It will be within the abilities of those skilled in the art to adapt the above description of the converter of FIG. 4 to this alternative embodiment.

In another variant, not shown, ramp RP is a potential ramp decreasing from potential Vbat and/or potential ramp RN is a potential ramp increasing from potential GND. It will be within the abilities of those skilled in the art to adapt the converter of FIG. 4 to this case.

Further, although an example where ramps RP and RN are compared with potential Vref, it will be within the abilities of those skilled in the art to implement the case where ramps RP and RN are compared with potential Vout.

The inventors have determined that the problem of timing diagram B, that is, the fact for current IL to have, at the end of a cycle, a value different from zero, is mainly caused, in the case of FIG. 4, by the delay caused by comparator(s) 306. The value TCOMP of this delay is known and preferably substantially constant.

The embodiment of FIG. 4 compensates, by using circuits configured to delay the control signals of transistors 9 and 13, for the delays and ensures that the value of the current always returns to a value substantially equal to zero between two cycles.

Thus, the gates, or control terminals, of transistors 9 and 13 are coupled to circuit 300 by a circuit 20.

Circuit 20 comprises two inputs, one being coupled, preferably connected, to node 175, and the other being coupled, preferably connected, to node 177. Circuit 20 further comprises two outputs, one being coupled, preferably connected, to the control terminal of transistor 9 and the other being coupled, preferably connected, to the control terminal of transistor 13.

Circuit 20 is configured to supply the control terminal of transistor 9 with:
    the control signal generated by circuit 300 on node 175 with a delay substantially equal to twice value TCOMP; or
    the control signal generated by circuit 300 on node 175 with a delay substantially equal to value TCOMP.

The two signals are supplied, preferably successively, by circuit 20 during each operating cycle of the converter, that is, during the period between the beginning of a ramp RP and the end of the ramp RN following the ramp RP.

Similarly, circuit 20 is configured to supply the control terminal of transistor 13 with the control signal generated by circuit 300 on node 177 with a delay substantially equal to value TCOMP.

In the example of FIG. 4, circuit 20 comprises a selection circuit 202, for example, a multiplexer, comprising two inputs, one output, and a control terminal. The output of multiplexer 202 is coupled, preferably connected, to the control terminal of transistor 9. Preferably, multiplexers 202 and 308 receive the same control signal sel.

A first input of multiplexer 202 is coupled to node 175 by a circuit 204 and a circuit 206. Circuit 204 is coupled between node 175 and a connection node 205 between circuits 204 and 206. Circuit 206 is coupled between connection node 205 and the first input of multiplexer 202. Each of circuits 204 and 206 is configured to apply a delay to the signal that it conducts, preferably a delay substantially equal to the delay caused by the comparator, that is, a delay substantially equal to value TCOMP. Thus, the signal received on the first input of multiplexer 202 corresponds to the control signal generated by circuit 300 on node 175 with a delay substantially equal to twice value TCOMP.

As a variant, circuits 204 and 206 may be replaced with a single circuit configured to generate a delay substantially equal to twice value TCOMP. Circuits 204 and 206 may be replaced with a larger number of circuits, for example, at least three, the circuits being configured so that the total delay generated by the circuits is substantially equal to twice value TCOMP.

A second input of multiplexer 202 is coupled to node 175 by circuit 204. Thus, the second input of multiplexer 202 is connected to the connection node 205 between circuits 204 and 206. Thus, the signal received on the second input of multiplexer 202 corresponds to the control signal generated by circuit 300 on node 175 with a delay substantially equal to value TCOMP, here generated by circuit 204.

As a variant, the second input of multiplexer 202 may be coupled to node 175 by another circuit, not shown, similar to one of circuits 204 and 206, that is, a circuit configured to apply a delay substantially equal to the delay caused by the comparator.

Circuit 20 further comprises a circuit 210. Circuit 210 is configured to apply a delay substantially equal to the delay caused by the comparator, that is, a delay substantially equal to value TCOMP. The control signal generated by circuit 300 on node 177 is supplied with a delay substantially equal to value TCOMP to the control terminal of transistor 13.

Circuits 204, 206, and 210 are preferably identical to within manufacturing dispersions. Circuits 204, 206, and 210 may be all types of circuits configured to add a delay of substantially known value to a signal crossing the circuits. Preferably, circuits 204, 206, and 210 do not bring other changes to the signals than the delay. The output signals of circuits 204, 206, and 210 are thus the same as the signals at the input of the circuits.

Figure 5:
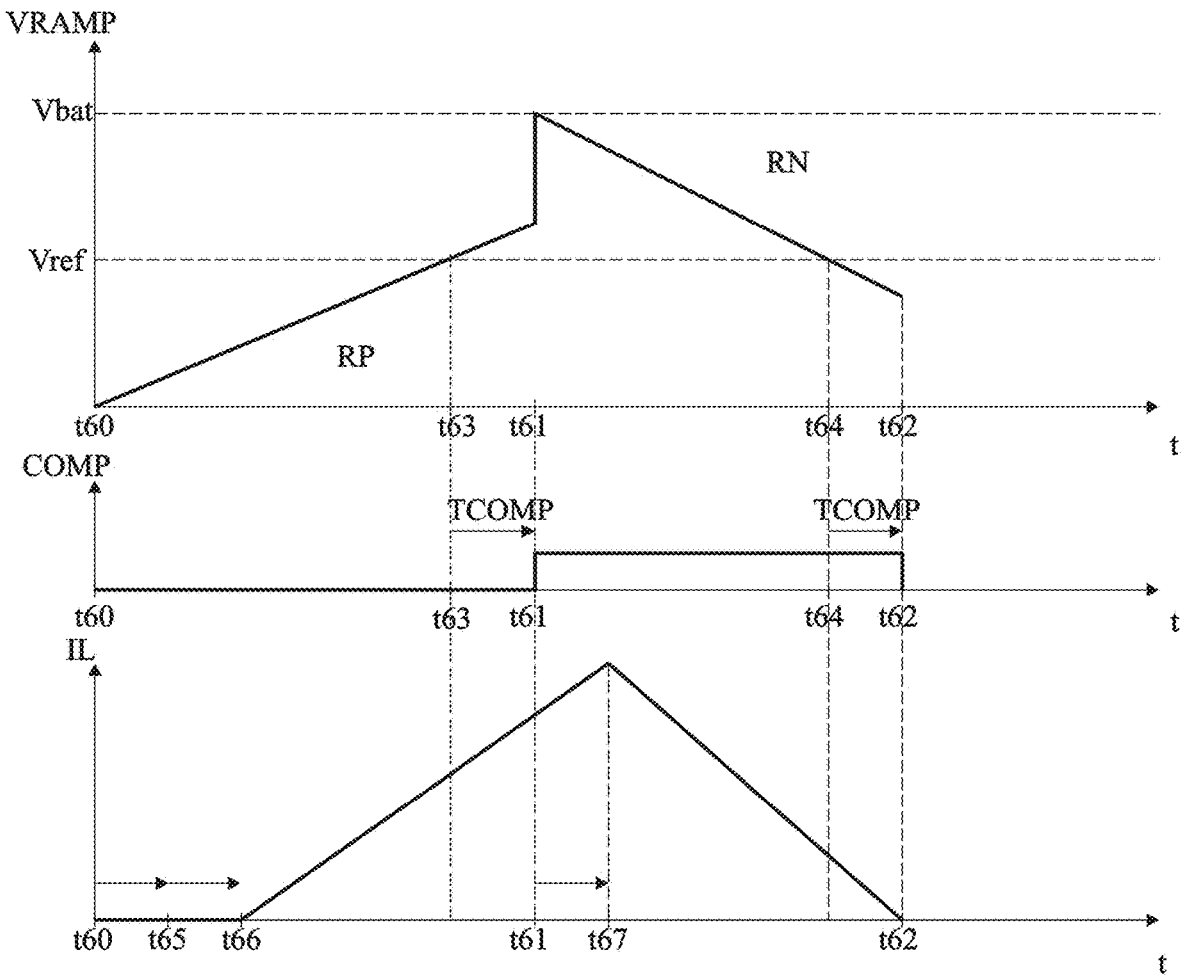
FIG. 5 shows timing diagrams illustrating the operation of the embodiment of FIG. 4.

FIG. 5 shows timing diagrams illustrating the operation of the embodiment of FIG. 4. More particularly, FIG. 5 shows, during an operating cycle of the converter:

the output voltage VRAMP of multiplexer 308,
the output signal COMP of comparator 306,
the current IL flowing through inductance 15,
the state of multiplexer 308 (mux1),
the state of multiplexer 202 (mux2),
the state of transistor 9 (T1), and
the state of transistor 13 (T2).

An operating cycle of the converter comprises a single ramp RP, generated by generator 304, and a single ramp RN, generated by generator 310. More particularly, between a time t60 and a time t61, voltage VRAMP takes the values of ramp RP, and between time t61 and a time t62, voltage VRAMP takes the values of ramp RN. An operating cycle of the converter thus corresponds to the time period between time t60 and time t62.

At time t60, voltage VRAMP increases from a value preferably equal to 0, following the variations of ramp RP. At time t60, voltage VRAMP is thus smaller than value Vref and signal COMP thus has a first value, for example, a low value corresponding to binary value 0 in the case of FIG. 5.

At a time t63 between time t60 and time t61, voltage VRAMP reaches set point value Vref. The output signal COMP of comparator 306 takes, at time t61, after the response time TCOMP of the comparator, a second value, for example, a high value corresponding to binary value 1, representative of the fact that voltage VRAMP is greater than value Vref. Time t61 occurs after duration TCOMP from time t63, that is, time t61 is equal to t63+TCOMP. Thus, between times t63 and t61, voltage VRAMP still follows the variations of ramp RP and keeps on increasing, beyond value Vref.

Between times t60 and t61, multiplexer 308 (mux1) outputs the signal RP generated by generator 304. The control signal sel of multiplexer 308, generated by circuit 300, takes the value ordering the multiplexer to output the signal originating from generator 304.

At time t61, voltage VRAMP becomes equal to ramp RN, for example, by modifying the value of the control signal sel of multiplexer 308. Voltage VRAMP thus takes a high value, higher than value Vref, for example, value Vbat, and decreases by following the variations of ramp RN. Voltage VRAMP thus still has a value greater than value Vref.

At a time t64, voltage VRAMP reaches value Vref. The output signal COMP of comparator 306 takes the first value representative of the fact that voltage VRAMP is smaller than value Vref at time t62, after response time TCOMP. Time t62 occurs after duration TCOMP from time t64, that is, time t62 is equal to t64+TCOMP. Thus, between times t64 and t62, voltage VRAMP still follows the variations of ramp RN and keeps on decreasing, beyond value Vref.

Between times t61 and t62, multiplexer 308 (mux1) outputs the signal RN generated by generator 310. The control signal sel of multiplexer 308, generated by circuit 300, takes the value ordering the multiplexer to output the signal originating from generator 310.

Thus, over an entire cycle, two delay periods TCOMP, caused by comparator 306, have to be compensated, to enable current IL to reach value 0 at time t62, and not at time t64, which would cause the fact for the value of current IL to become negative between times t64 and t62. Current IL would then be negative at the end of a cycle, which would cause the disadvantages described in relation with FIG. 3.

At time t60, that is, at the beginning of the cycle, transistors 9 and 13 (T1, T2) are preferably off (OFF). Optionally, transistor 13 (T2) may be on (ON). Ramp RP being supplied at the output of multiplexer 308, the values of the control signals of transistors 9 and 13, generated by circuit 300, correspond to the switching to the on state of transistor 9 and to the switching to the off state of transistor 13. However, at time t60, multiplexer 202 (mux2) is configured to output the control signal (2D) of transistor 9 with a delay substantially equal to twice duration TCOMP. Further, the control signal of transistor 13 is always supplied with a delay of once duration TCOMP.

Thus, at a time t65 subsequent to time t60 and equal to t60+TCOMP, transistor 13 receives the order to switch to the off state, generated at time t60. In the example of FIG. 4, the control signal does not change the state of transistor 13. Further, at a time t66, equal to t60+2*TCOMP, and thus to t65+Tcomp, transistor 9 receives the order to switch to the on state, generated by circuit 300 at time t60. Transistor 9 thus turns on (ON) at time t66.

Although voltage VRAMP has started at time t60, transistor 9 only turns on at time t66. The power storage in the inductance thus only starts at time t66.

Between times t60 and t66, current IL is constant and substantially equal to value 0. From time t66, the value of current IL increases.

At time t61, the value of signal COMP at the output of comparator 306 takes, with a delay of TCOMP with respect to the passing of the voltage above value Vref, the high value, representative of the fact that voltage VRAMP has become greater than value Vref. Control signal sel then switches value. Multiplexer 308 is then configured by signal sel to output the signal generated by generator 310, that is, ramp RN. Voltage VRAMP then follows the variations of ramp RN. Further, at time t61, the control signal of multiplexer 202, for example, signal sel, changes. Multiplexer 202 is then configured to output the control signal (1D) generated by circuit 300 on node 175 with a delay TCOMP.

Between times t61 and t62, the control signals of transistors 9 and 13 are supplied with a same delay TCOMP. Transistors 9 and 13 thus receive the signal corresponding to the switching to the on state of transistor 13 and to the switching to the off state of transistor 9 at a time t67 subsequent to time t61. Time t67 is separated from time t61 by once duration TCOMP, that is, t67 is equal to t61+TCOMP. Current IL then starts decreasing.

At time t62, the value of signal COMP at the output of comparator 306 takes, with a delay TCOMP with respect to the passing of the voltage below value Vref, the low value, representative of the fact that value VRAMP has become smaller than value Vref. The operating cycle is thus over. The value of current IL thus stops decreasing and the current value at time t62 is substantially equal to 0.

The time period between times t60 and t63 is substantially equal to the time period between times t66 and t67. In other words, the time period between the time when voltage VRAMP starts following ramp RP and the time when voltage VRAMP reaches value Vref is substantially equal to the time period TPon during which transistor 9 is on and transistor 13 is off. Similarly, the time period between times t61 and t64 is substantially equal to the time period between times t67 and t62. In other words, the time period between the time when voltage VRAMP starts following ramp RN and the time when voltage VRAMP reaches value Vref, is substantially equal to the time period TNon for which transistor 9 is off and transistor 13 is on. The duration of each cycle is thus equal to TPon+TNon+2*TCOMP.

The current IL at the end of each cycle is substantially equal to zero, the propagation times of comparator 306 having been compensated. This enables the next cycle to be identical to the previous one and not to cause a drift of the maximum current peak. The maximum current peak is substantially equal to its value in the ideal case of the timing diagram A of FIG. 3.

Preferably, multiplexers 308 and 202 receive the same control signal sel. Indeed, multiplexers 202 and 308 change the signal output at the same times. Signal sel can thus take a first value corresponding, for multiplexer 308, to the outputting of the signal RP generated by generator 304 and, for multiplexer 202, to the outputting of the signal (2D) delayed by twice duration TCOMP. Signal sel can also take a second value corresponding, for multiplexer 308, to the outputting of the signal RN generated by generator 310 and, for multiplexer 202, to the outputting of the signal (1D) delayed by once duration TCOMP.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereinabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A voltage converter comprising:
 a first transistor connected between a first node of the converter and a second node configured to receive a power supply potential;
 a second transistor connected between the first node of the converter and a third node configured to receive a reference potential; and
 a first circuit configured to control the first and second transistors;
 a control terminal of the second transistor being coupled to a first output of the first circuit by a second circuit configured to delay control signals supplied at the first output by a first duration;
 a control terminal of the first transistor being coupled to a second output of the first circuit by a third circuit configured to delay control signals supplied at the second output, during a first period of each operating cycle, by a second duration substantially equal to twice the first duration and, during a second period of each operating cycle, by a third duration substantially equal to the first duration.

2. The converter according to claim 1, wherein the first duration is a propagation time of a comparator.

3. The converter according to claim 1, further comprising a comparator configured to compare a set point voltage with a first voltage, the first voltage being equal, during the first period, to a first increasing ramp and, during the second period, to a second decreasing ramp.

4. The converter according to claim 3, wherein the converter comprises a first multiplexer having an output coupled to an input of the comparator and having a first input coupled to a first ramp generator and a second input coupled to a second ramp generator.

5. The converter according to claim 4, wherein the third circuit comprises a second multiplexer comprising an output coupled to the control terminal of the first transistor and receiving, on a first input, a control signal of the first transistor delayed by twice the first duration and, on a second input, the control signal of the first transistor delayed by once the first duration.

6. The converter according to claim 5, wherein each operating cycle comprises only one first ramp and only one second ramp, and the first and second multiplexers receive a same multiplexer control signal configured to have:
 a first value corresponding, for the first multiplexer, to an outputting of the first ramp, and, for the second multiplexer, to an outputting of the control signal delayed by twice the first duration, and a second value corresponding, for the first multiplexer, to an outputting of the second ramp, and, for the second multiplexer, to an outputting of the control signal delayed by once the first duration.

7. The converter according to claim 3, wherein each operating cycle comprises only one first ramp and only one second ramp.

8. The converter according to claim 3, wherein the first ramp increases from a value smaller than the set point voltage and the second ramp decreases from a value greater than the set point voltage.

9. The converter according to claim 3, wherein the first duration is substantially equal to a propagation time of the comparator.

10. The converter according to claim 1, wherein the converter comprises an inductance connected between the first node and an output node of the converter.

11. The converter according to claim 10, wherein a value of a current in the inductance at a beginning and at an end of a cycle is substantially equal to 0.

12. A method of operating a voltage converter, the voltage converter comprising a first transistor connected between a first node of the converter and a second node configured to receive a power supply potential, a second transistor connected between the first node of the converter and a third node configured to receive a reference potential, and a first circuit configured to control the first and second transistors, the method comprising, during each operating cycle:

during a first period:
delaying, by a second circuit, a control signal of the second transistor by a first duration; and
delaying, by a third circuit, a control signal of the first transistor by a second duration substantially equal to twice the first duration; and during a second period:
delaying, by the second circuit, the control signal of the second transistor by the first duration; and
delaying, by the third circuit, the control signal of the first transistor by a third duration substantially equal to the first duration.

13. The method according to claim 12, wherein the first duration is a propagation time of a comparator.

14. The method according to claim 12, further comprising comparing, by a comparator, a set point voltage with a first voltage, the first voltage being equal, during the first period, to a first increasing ramp and, during the second period, to a second decreasing ramp.

15. The method according to claim 14, further comprising:

receiving, by a first input of a first multiplexer, the first ramp;
receiving, by a second input of the first multiplexer, the second ramp; and
providing, by the first multiplexer, an output to an input of the comparator.

16. The method according to claim 15, further comprising:

receiving, on a first input of a second multiplexer in the third circuit, a control signal of the first transistor delayed by twice the first duration;
receiving, on a second input of the second multiplexer, the control signal of the first transistor delayed by once the first duration; and
providing, by the second multiplexer, an output to a control terminal of the first transistor.

17. The method according to claim 16, wherein each operating cycle comprises only one first ramp and only one second ramp, and the first and second multiplexers receive a same multiplexer control signal configured to have:

a first value corresponding, for the first multiplexer, to an outputting of the first ramp, and, for the second multiplexer, to an outputting of the control signal delayed by twice the first duration, and
a second value corresponding, for the first multiplexer, to an outputting of the second ramp, and, for the second multiplexer, to an outputting of the control signal delayed by once the first duration.

18. The method according to claim 14, wherein each operating cycle comprises only one first ramp and only one second ramp.

19. The method according to claim 14, wherein the first ramp increases from a value smaller than the set point voltage and the second ramp decreases from a value greater than the set point voltage.

20. The method according to claim 14, wherein the first duration is substantially equal to a propagation time of the comparator.

21. The method according to claim 12, further comprising providing an inductance connected between the first node and an output node of the converter.

22. The method according to claim 21, wherein a value of a current in the inductance at a beginning and at an end of a cycle is substantially equal to 0.

* * * * *